(12) United States Patent
Harper

(10) Patent No.: US 6,763,678 B2
(45) Date of Patent: Jul. 20, 2004

(54) PORTABLE COOLER HAVING MULTIPLE COMPARTMENTS

(76) Inventor: Scott M. Harper, 1070 Hackberry Cir., Rochester Hills, MI (US) 48302

(*) Notice: Subject to any disclaimer, the term of this patent is extended or adjusted under 35 U.S.C. 154(b) by 0 days.

(21) Appl. No.: 10/308,583

(22) Filed: Dec. 3, 2002

(65) Prior Publication Data

US 2003/0101744 A1 Jun. 5, 2003

Related U.S. Application Data

(60) Provisional application No. 60/338,494, filed on Dec. 3, 2001.

(51) Int. Cl.[7] .............................. F25D 3/08; F25D 3/02
(52) U.S. Cl. ............................. 62/461; 62/459; 62/462; 62/457.7
(58) Field of Search ................................ 62/461, 457.7, 62/457.2, 464, 459, 529, 371, 372

(56) References Cited

U.S. PATENT DOCUMENTS

| | | | |
|---|---|---|---|
| 4,424,687 A | * | 1/1984 | Morgan ..................... 62/457.1 |
| 4,515,421 A | * | 5/1985 | Steffes ........................ 312/351 |
| 5,052,184 A | * | 10/1991 | Jarvis ............................ 62/60 |
| 6,193,097 B1 | * | 2/2001 | Martin Perianes ..... 220/592.03 |

\* cited by examiner

Primary Examiner—Chen Wen Jiang
(74) Attorney, Agent, or Firm—Artz & Artz, PC

(57) ABSTRACT

A portable cooler having a body portion, including a bottom face, a front face, a rear face, and a pair of opposing side portions. The body portion defines an internal cavity. The cooler includes a lid portion that is in communication with the body portion. The internal cavity has at least one partition member disposed therein that is lying generally parallel to the bottom face. The at least one partition member divides the internal cavity into an upper portion and a lower portion. The at least one partition member includes a plurality of holes formed therein such that ice can be positioned with the contents of the cooler in the upper portion and water can flow through the plurality of holes to accumulate in the lower portion as the ice melts.

6 Claims, 2 Drawing Sheets

PORTABLE COOLER HAVING MULTIPLE COMPARTMENTS

CROSS-REFERENCE TO RELATED APPLICATIONS

The present application claims priority from U.S. Provisional Application Serial No. 60/338,494, filed Dec. 3, 2001, and entitled "Portable Compartmentalized Cooler."

TECHNICAL FIELD

The present invention relates generally to a portable cooler design and, more particularly, to a portable cooler design that includes multiple compartments to separate the contents of the cooler from accumulated water.

BACKGROUND OF THE INVENTION

Coolers for keeping stored food and beverages cold are well known. These coolers come in a variety of different shapes sizes and typically allow user to transport food or beverages from one location to the other while maintaining the contents of the cooler at a relatively cool temperature. As is known, it is desirable to maintain the contents of the cooler, such as, for example, beverages, at a cool temperature so the beverages may be more readily enjoyed. As is also known, it is sometimes necessary to maintain the contents of a cooler at a cool temperature to prevent spoiling of the contents, such as for example, sandwiches or other food.

The contents of the coolers are typically kept at a relatively cool by filling the cooler with ice and then placing the items to be kept cool on top of the ice within the cooler. Alternatively, and to provide better cooling, the ice and the contents are intermixed. This works well, with respect to beverages, such as are stored in cans or bottles. However, this intermixing does not work as well with foods, such as sandwiches. This is because when the ice is placed on top of the food, the food can be crushed. Further, when the food is intermixed with the ice, the food, which is typically not stored or kept in completely water proof packages, can get wet or soggy when the ice melts as the food will be in contact with accumulated water in the cooler. The food can also get wet or soggy when the ice melts, even if the food is placed on top of the ice. These conditions are clearly undesirable.

One attempt to eliminate this problem of food stored in a cooler coming to rest in accumulated water when the ice melts and therefore causing the food to get wet is though the use of contained frozen ice packs. While these ice packs do not emit water and they tend not to remain cool as long, they typically take up a lot of space within the cooler. These ice packs are also relatively expensive and tend not to work as well as ice.

SUMMARY OF THE PRESENT INVENTION

Accordingly, it is an object of the present invention to provide a cooler having multiple compartments to separate accumulated water from the cooler contents as ice in the cooler melts.

It is another object of the present invention to provide a cooler having multiple compartments to prevent food in the cooler from getting wet when the ice in the cooler melts.

It is a further object of the present invention to provide a cooler with a removable insert or partition.

In accordance with the above and other objects of the present invention, a portable cooler is provided. The cooler includes a body portion that defines an interior cavity therewithin. The cooler has a lid portion that is in communication with said exterior shell portion. The interior cavity has at least one partition that separates the interior cavity into at least two compartments with at least a first compartment intended for receiving ice and a second compartment intended for receiving food. This prevents the food from becoming wet and/or soggy due to contact with accumulated water in the event the food remains in the cooler long enough for the ice to begin melting.

These and other features and advantages of the present invention will become apparent from the following description of the invention, when viewed in accordance with the accompanying drawings and appended claims.

DETAILED DESCRIPTION OF THE PREFERRED EMBODIMENTS

Figure 1:
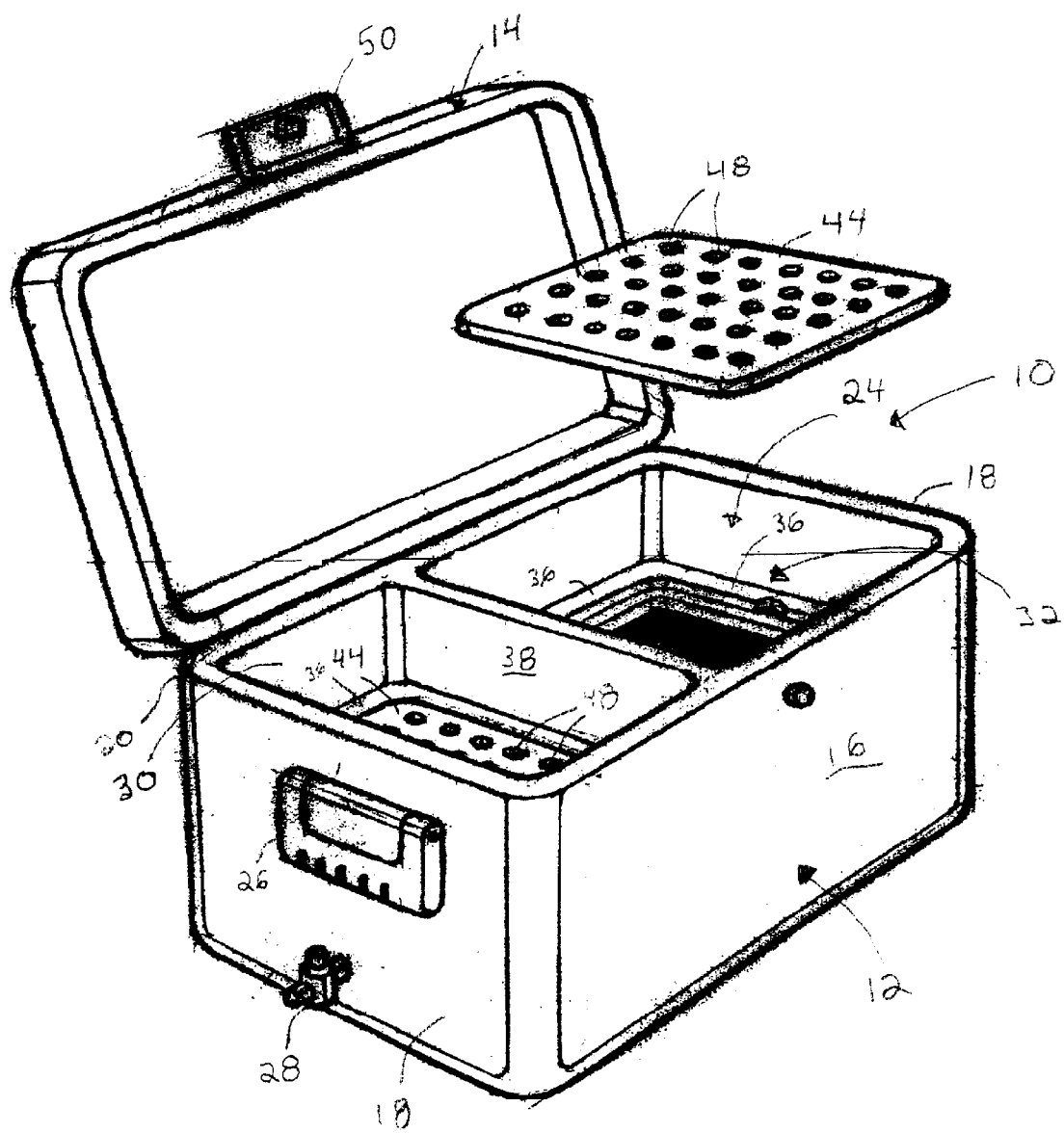
FIG. 1 is a perspective view of a portable cooler in accordance with one embodiment of the present invention.

Referring now to the Figures, which illustrate a portable cooler 10 in accordance with one embodiment of the present invention. As shown, the cooler 10 has a body portion 12 and a lid portion 14, which is engagable with the body portion 12 and is moveable between a closed portion and an open portion. As shown, in one embodiment, the lid portion 14 is pivotally attached to the body portion 12, such as by a hinge or the like. Alternatively, the lid portion 14 may be unconnected from the body portion 12, such that it can be entirely removable. In one embodiment, the body portion 12 and the lid portion 14 are constructed of a plastic material and are formed by known injection molding techniques. However, it will be understood that the body portion 12 and the lid portion 14 can be constructed of a variety of other materials.

As shown, the body portion 12 is preferably formed as an integral piece and has a front portion 16, a pair of opposing side portions 18, a back portion 20, and a bottom portion 22. The front portion 16, the pair of opposing side portions 18, and the back portion 20 define an internal cavity 24 for the cooler 10. The cooler 10 also preferably includes one or more handle portions 26 that allow the cooler 10 to be easily transported. In one embodiment, a handle portion 26 is located on each of the opposing side portions 18. However, it will be understood that the handle portions 26 can be located in a variety of other locations. Further, the body portion 12 preferably includes a drainage valve 28 that is in a normally closed position, but can be opened to allow any accumulated water or fluid from within the internal cavity 22 to drain.

The internal cavity 22 is divided up into multiple compartments. In one embodiment, the internal cavity 24 includes an insert or partition 30 that fits within the internal cavity 24 and generally separates the internal cavity 26 into an upper portion 32 and a lower portion 34. The insert 30 is generally removable and is in communication with a respective shoulder 36 that is located on the interior of at least each side portion 18, such that the insert is securely positioned within the internal cavity 24. It will be understood that the insert 30 can be secured to each of the side portions 18 or otherwise retained within the internal cavity 24 in a variety of different ways. It will also be understood that the shoulders 36 can be integrally formed as part of the body portion 12 or as part of the insert 30. Alternatively, the insert 30 can be retained within the internal cavity 24 by being secured to or in communication with other portions of the body portion 12, including the front portion 16 and/or the back portion 20.

Because the internal cavity 24 is divided into an upper portion 32 and a lower portion 34, the lower portion 34 can be filled with ice with the food or other contents to be kept cool being located on top of the insert 30 and in the upper portion 32. Thus, as the ice melts, the contents to be kept cool, such as food, are separated from any accumulated water resulting from melted ice, will remain dry and cool.

The insert 30 also includes a divider member 38 secured thereto that segregates the upper portion 32 into multiple compartments 40, 42. In this embodiment, the partition 30 is comprised of multiple plates 44. Each of the plates 44 is supported by a respective shoulder 36 in one of the opposing side portions 18 and a flange 46 formed on the partition 30. This allows each of the plates 44 to be removed and desired. The plates 44 are preferably formed from a metal material, but may also be formed from plastic or a variety of other suitable materials. Additionally, in one embodiment, the plates 44 have a plurality of holes 48 formed therein. This allows both food and ice to be placed in the upper portion 32 of the body portion 12. As the ice melts, the water will pass through the plurality of holes 48 and into the lower portion 34. Therefore, the food will remain cool, but will not get soggy due to prolonged contact with accumulated water as the ice in the cooler 10 melts.

Figure 2:
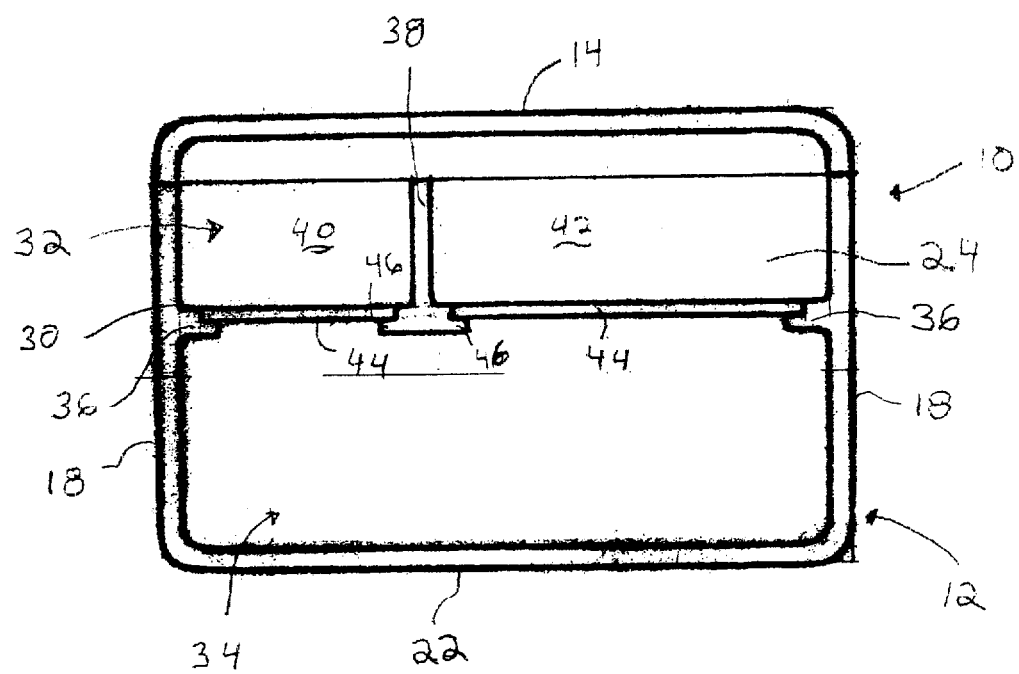
FIG. 2 is a cross-sectional view of a portable cooler in accordance with one embodiment of the present invention.

In FIG. 1, the cooler 10 is shown in an open position such that the lid portion 14 is not entirely covering the body portion 12 and the internal cavity 24 is exposed. FIG. 2 illustrates the cooler 10 in a closed position where the lid portion 14 is fully covering the internal cavity 24. The lid portion 14 is preferably securely fastened to the body portion 12 by a latch 50 or other suitable closing mechanism.

Having now fully described the invention, it will be apparent to one of ordinary skill in the art that many changes and modifications can be made thereto without departing from the spirit or scope of the invention as set forth herein.

What is claimed is:

1. A portable cooler, comprising:
   a body portion defining an interior cavity;
   a top portion that is engagable with said body portion to prevent access to said interior cavity;
   a first partition member located in said body portion and dividing said body portion into an upper cavity and a lower cavity;
   a second partition member that divides said upper cavity into multiple compartments;
   at least one access door formed in said first partition member allowing a user to access and retrieve items from said lower compartment without removal of said first partition member;
   whereby food can be placed in said upper cavity on said first partition member such that as said ice melts water accumulates in said lower cavity such that the food in the cooler will not be subjected to accumulated water for prolonged periods.

2. The cooler of claim 1, wherein said first partition member includes at least one drain hole formed therein to allow ice to be located in said upper cavity, said at least one drain hole allowing water to flow to said lower cavity as said ice melts.

3. The cooler of claim 2, wherein said first partition member includes a plurality of holes formed therein.

4. A portable cooler, comprising:
   a body portion, including a bottom face, a front face, a rear face, and a pair of opposing side portions, which together define an internal cavity;
   a lid portion in communication with said body portion;
   a first member disposed in said internal cavity and lying generally parallel to said bottom face, said partition member dividing said internal cavity into an upper portion and a lower portion;
   a second partition member disposed in said internal cavity and lying generally perpendicular to said bottom face and dividing said upper portion into multiple compartments;
   at least one access door formed in said first partition member to allow a user to access and retrieve items from said lower compartment without removal of said first partition member; and
   a plurality of holes formed in said first partition member to allow ice to be positioned with the contents of the cooler in said upper portion and allowing water to flow through said plurality of holes to accumulate in said lower portion as the ice melts.

5. The cooler of claim 1, wherein said first partition member is constructed of a metal material.

6. The cooler of claim 4, wherein said lid portion is hingeably attached to said body portion.

* * * * *

UNITED STATES PATENT AND TRADEMARK OFFICE
CERTIFICATE OF CORRECTION

PATENT NO. : 6,763,678 B2  
APPLICATION NO. : 10/308583  
DATED : July 20, 2004  
INVENTOR(S) : Scott M. Harper Page 1 of 1

It is certified that error appears in the above-identified patent and that said Letters Patent is hereby corrected as shown below:

Column 4, line 43:

Please replace claim 5 with the following:

The cooler of claim 4, wherein said first partition member is constructed of a metal material.

Signed and Sealed this

Nineteenth Day of June, 2007

JON W. DUDAS  
*Director of the United States Patent and Trademark Office*